3,354,128
ALPHA-CYANOACRYLATE/PHTHALIC ACID ESTER ADHESIVE COMPOSITIONS

Thomas H. Wicker, Kingsport, Tenn., assignor to Eastman Kodak Company, Rochester, N.Y., a corporation of New Jersey
No Drawing. Filed Sept. 1, 1964, Ser. No. 393,740
9 Claims. (Cl. 260—78.5)

This invention relates to improved adhesive compositions based on esters of alpha-cyanoacrylic acid.

The use of esters of α-cyanoacrylic acid as adhesives was disclosed in Coover and Shearer, U.S. Patent No. 2,794,788. The monomeric α-cyanoacrylate esters of the formula:

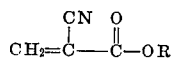

in which R is an alkyl group of 1 to 8 carbon atoms, allyl or methallyl, cyclohexyl or phenyl, when applied as a liquid on a surface to be bonded, polymerize to give a strong adhesive bond. Although the monomers are relatively stable in bulk storage they polymerize rapidly when spread in a thin film and an adhesive bond can be obtained in a very short time, for example, in a few seconds or minutes without the use of heat or pressure or prolonged clamping of the surfaces to be bonded.

Several improvements in the cyanoacrylate adhesives have been made. For example, the bonds formed by the α-cyanoacrylate monomers alone are rather brittle. The Coover and Joyner patent U.S. 2,784,127 discloses monomeric α-cyanoacrylate adhesive compositions containing plasticizing substances that produce a more flexible adhesive bond.

As with many adhesives, the bonds formed by the α-cyanoacrylate adhesives do not always resist deterioration by water and heat to the degree that would be desired. Variations in the adhesive compositions have been made for improving them in these respects, but without complete success in improving all of the desired properties. The present invention is based on our discovery of novel plasticized α-cyanoacrylate adhesive compositions having improved resistance to water and to heat. The compositions of the invention comprise an ester of α-cyanoacrylic acid of the type described above in admixture with a minor amount of a phthalic acid ester of the formula:

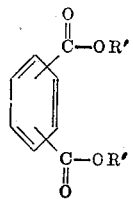

wherein R' is allyl, methallyl or crotyl.

Suitable phthalic acid esters thus include diallyl phthalate, diallyl isophthalate, diallyl terephthalate, dimethallyl phthalate, dimethallyl isophthalate, dimethallyl terephthalate, dicrotyl phthalate and the like. These phthalic acid esters show their most remarkable effects when they are present in the adhesive compositions in amounts of from 1 to 25 percent by weight and preferably from 5 to 15 percent by weight.

The following examples illustrated compositions in accordance with the invention and the properties of such compositions.

Example 1

An adhesive formulation was prepared by dissolving 0.5 g. of diallyl phthalate, 0.25 g. of a poly(methyl methacrylate) (I.V.=1.1), and 4.25 g. of methyl 2-cyanoacrylate. Steel-steel bonds were prepared from this mixture and cured overnight at room temperature. The bonds were then placed in the steam bath. After four days in the steam bath at 100° C. the bonds were still intact.

The above test was repeated with the exception that diethyl phthalate rather than diallyl phthalate was used. The steel-steel bonds came apart after one day in the steam bath at 100° C.

Example 2

The procedure of Example 1 was repeated with the exception that diallyl phthalate was replaced with diallyl isophthalate and methyl 2-cyanoacrylate was replaced by 2-ethylhexyl α-cyanoacrylate. The steel-steel bond prepared from this formulation remained intact in the steam bath for a period of four days.

Example 3

The procedure of Example 1 was repeated with the exception that diallyl phthalate was replaced with dicrotyl phthalate. The steel-steel bond was still intact in the steam bath after three days.

Example 4

An adhesive formulation was prepared from diallyl phthalate (0.5 g.) and allyl α-cyanoacrylate (9.5 g.). Steel bonds prepared from this formulation were still intact in the steam bath after five days.

Example 5

An adhesive formulation was prepared from diallyl phthalate (0.5 g.) and cyclohexyl α-cyanoacrylate (9.5 g.). Steel bonds prepared from this mixture were still intact after five days in the steam bath.

Example 6

An adhesive formulation was prepared from dimethallyl isophthalate (0.5 g.) and ethyl α-cyanoacrylate (9.5 g.). Steel bonds prepared from this mixture were intact after four days in the steam bath.

Example 7

The diallyl phthalate containing adhesive of Example 1 was used to prepare bonds between glass microscope slides. These bonds were cured 24 hours at room temperature and then placed in the steam bath. The bonds came apart only after remaining in the steam bath overnight.

The compositions of the invention are particularly suited for applications in which heat or water resistance is desirable. Conventional α-cyanoacrylate adhesive compositions plasticized with monomeric plasticizers do not show the superior heat resistance exhibited by the compositions of the present invention. Although we do not wish to be bound by theoretical explanations, we believe that the unsaturated plasticizer components undergo polymerization under the influence of heat and thereby enhance the heat and water resistance of the adhesive bonds.

Although the α-cyanoacrylate monomer and the phthalic acid ester are the only essential components of the novel compositions of the invention and compositions containing them alone yield at least some of the benefits of the invention, the adhesive compositions will normally contain one or more additional components of the types described in the prior patents on α-cyanoacrylate adhesives. They may, for example, contain stabilizers to further improve their stability against polymerization during storage, for example, 0.0001 to about 2 percent by weight of gaseous, acidic polymerization inhibitor such as sulfur dioxide, nitric oxide, hydrogen fluoride, boron trifluoride or the like. They may also contain from about 0.0001 to 0.01 percent by weight of a neutral free radical inhibitor such as hydroquinone, trinitrobenzene, or t-butyl catechol in admixture with the acidic inhibitor, as disclosed in U.S. 2,816,093.

It is sometimes desirable to employ an adhesive composition that is more viscous than the α-cyanoacrylate monomer, e.g., to avoid excessive penetration of porous materials. Therefore, the compositions of the invention can also contain a polymeric viscosity regulator or thickener such as polymeric methyl α-cyanoacrylate, poly(methyl methacrylate), poly(methyl acrylate), cellulose acetate, or the like, in an amount up to about 25 percent by weight of the total composition.

The phthalic esters described herein have a plasticizing effect on the α-cyanoacrylate bond. However, the compositions of the invention can also contain conventional plasticizers to provide still further flexibility to the adhesive bonds, including saturated diesters such as dialkyl phthalates, sebacates, adipates and other plasticizers such as disclosed in U.S. 2,784,127.

The compositions of the invention can be used for adhering a wide range of substances. They produce better bonds with some materials than with others but in general form a rapid bond of strength ranging from moderate to very strong with various metals such as steel, aluminum, and brass; glass; plastics such as cellulose acetate, poly(vinyl chloride), and polystyrene; wood; leather; etc. In fact they can even bond flesh and bones in surgical or veterinary use.

Although the invention has been described in considerable detail with particular reference to certain preferred embodiments thereof, it will be understood that variations and modifications can be effected within the spirit and scope of the invention as described hereinabove, and as defined in the appended claims.

I claim:
1. An adhesive composition comprising an α-cyanoacrylate ester of the formula:

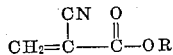

wherein R is selected from the group consisting of alkyl from 1 to 8 carbon atoms, allyl, methallyl, cyclohexyl and phenyl, and about 1 percent to about 25 percent by weight of a phthalic acid ester of the formula:

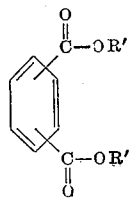

wherein R' is selected from the group consisting of allyl, methallyl and crotyl.

2. An adhesive composition in accordance with claim 1 in which the phthalic acid ester is present in an amount of from 5 to 15 percent by weight of the adhesive composition.

3. An adhesive composition comprising methyl α-cyanoacrylate and from 5 to 15 percent by weight of a phthalic acid ester of the formula:

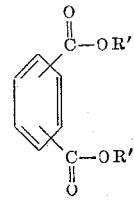

wherein R' is selected from the group consisting of allyl, methallyl and crotyl.

4. An adhesive composition comprising methyl α-cyanoacrylate and about 1 percent to about 25 percent by weight of diallyl phthalate.

5. An adhesive composition comprising methyl α-cyanoacrylate and about 1 percent to about 25 percent by weight of diallyl isophthalate.

6. An adhesive composition comprising methyl α-cyanoacrylate and about 1 percent to about 25 percent by weight of dicrotyl phthalate.

7. An adhesive composition comprising allyl α-cyanoacrylate and about 1 percent to about 25 percent by weight of diallyl phthalate.

8. An adhesive composition comprising cyclohexyl α-cyanoacrylate and about 1 percent to about 25 percent by weight of diallyl phthalate.

9. An adhesive composition comprising ethyl α-cyanoacrylate and about 1 percent to about 25 percent by weight of dimethallyl isophthalate.

References Cited

UNITED STATES PATENTS

| | | | |
|---|---|---|---|
| 2,514,185 | 7/1950 | Eberly | 260—45.9 |
| 2,542,827 | 2/1951 | Minter | 260—78.5 |
| 2,784,127 | 3/1957 | Joyner et al. | 260—88.7 |

JOSEPH L. SCHOFER, *Primary Examiner.*

JAMES A. SEIDLECK, *Examiner.*

H. W. WONG, *Assistant Examiner.*